United States Patent [19]

Darby et al.

[11] Patent Number: 4,623,972
[45] Date of Patent: Nov. 18, 1986

[54] HALF-TONE DOT IMAGING

[75] Inventors: Samuel E. Darby, Harrow; George C. Manley, North Harrow, both of England

[73] Assignee: Crosfield Electronics Limited, London, England

[21] Appl. No.: 727,154

[22] Filed: Apr. 25, 1985

[30] Foreign Application Priority Data

Apr. 27, 1984 [GB] United Kingdom ............... 8410861

[51] Int. Cl.⁴ ..................... H04N 1/23; H04N 1/40
[52] U.S. Cl. .................................. 364/526; 358/283; 358/298
[58] Field of Search ............... 364/526, 525; 355/32, 355/37, 54, 67, 69, 71, 70; 430/357, 363; 358/75, 283, 298, 299

[56] References Cited

U.S. PATENT DOCUMENTS

| 3,922,484 | 11/1975 | Keller ............................. 358/283 |
| 4,025,189 | 5/1977 | Pugsley ........................... 355/70 X |
| 4,276,567 | 6/1981 | Wellendorf et al. ........... 358/283 X |
| 4,468,442 | 8/1984 | Sakamoto ...................... 355/69 X |

FOREIGN PATENT DOCUMENTS 2102240A 1/1983 United Kingdom .
2123647A 2/1984 United Kingdom .

Primary Examiner—William B. Perkey
Attorney, Agent, or Firm—Sughrue, Mion, Zinn, Macpeak and Seas

[57] ABSTRACT

Method and apparatus for generating a half-tone dot representation of an original image which has been previously generated as one or more color separations each comprising a plurality of cells (12), each cell being digitally encoded in accordance with the color density at that point is described. The apparatus comprises a record medium support (8); a plurality of scanning beam generators arranged side by side, the scanning beams (B1-6) and the record medium support (8) being relatively movable. First control means controls the scanning beams during relative movement between the scanning beams and the record medium support (8) in response to the digital information and half-tone dot information to generate a plurality of half-tone dots (14) at a first rate, each dot corresponding to one or more of the plurality of cells (12). Storage means (23) for storing additional control information; and second control (24) means for determining the position of the scanning beams relatively to the record medium, determining whether that position corresponds to part of a boundary of an image poriton, and, if it does, for at least one color separation, for each cell at the boundary of an image portion modifying the plurality of scanning beams in response to the additional control information:

(i)a together at a second higher rate, or
(i)b in groups of one or more, or
(i)c in groups of one or more and at a second, higher rate, and
(ii) in response to color density information partly corresponding to that cell and partly corresponding to one or more adjacent cells.

The invention thus puts a relatively high resolution edge on a relatively low resolution image.

8 Claims, 4 Drawing Figures

HALF-TONE DOT IMAGING

The invention relates to a method and apparatus for generating a half-tone dot representation of an original image.

In conventional half-tone dot imaging, an original image is scanned into one or more colour separations each comprising a plurality of cells, each cell being digitally encoded in accordance with the colour density of the original image at that point. Typically, graphics images require up to four colour separations (normally cyan, magenta, yellow, and black) each colour separation being represented by a plurality of graphics cells. Normally, there are about 900 square graphics cells for each square inch of the image. The colour separations are stored as sets of digital data representing the density of the particular colour in each cell. During image reproduction, a record medium is exposed to a plurality of scanning beams and during relative movement of the scanning beams and the record medium the beams are controlled in response to the digital information and half-tone dot information to generate a plurality of half-tone dots whose size varies in accordance with the corresponding colour density. Normally, the record medium is notionally divided into a plurality of dot cells and a half-tone dot is formed, where appropriate, in each dot cell. It is conventional for there to be four graphics cells to each dot cell.

Graphics images as described above are often referred to as low resolution images. The terms "low" and "high" are only intended to be relative and typically a "low resolution" image will contain 900 pixels per square inch. However, in some cases when the edge of a low resolution half-tone dot representation or the junction between two such low resolution images is viewed, it is found that the significant size of the dot cells leads to stepping along the boundary or junction. This is clearly undesirable.

One possible solution to this is to scan the original image at a higher resolution but this leads to a considerable increase in the time and data involved.

In accordance with one aspect of the present invention, a method of generating a half-tone dot representation of an original image which has been previously scanned into one or more colour separations each comprising a plurality of cells, each cell being digitally encoded in accordance with the colour density of the original image at that position comprises for one or more of the colour separations exposing a record medium to a plurality of scanning beams arranged side by side, the scanning beams being controlled together at a first rate, during relative movement between the scanning beams and the record medium, in response to the digital information and half-tone dot information to generate a plurality of half-tone dots, each dot corresponding to one or more of the plurality of cells; and for each cell at the boundary of an image portion modifying the plurality of scanning beams;

(i)a together at a second, higher rate, or
  (i)b in groups of one or more, or
  (i)c in groups of one or more and at a second, higher rate, and
  (ii) in response to colour density information partly corresponding to that cell and partly corresponding to one or more adjacent cells.

This invention enables a "higher resolution" edge to be provided around a lower resolution image and enables the junction between two low resolution images to be effectively at high resolution without scanning the image at high resolution.

It should be understood that by "image portion" we mean either a portion of the image where only a single image is concerned or an individual subsidiary image where the original image comprises more than one subsidiary image. For example, one of the important advantages of the invention is that text images which must normally be scanned at high resolution could, where they are relatively large in comparison with the graphic cell size, be scanned at graphics resolution and be provided with a high resolution edge in accordance with the invention.

Typically, the plurality of scanning beams will comprise six scanning beams arranged side by side as in the Crosfield Magnascan 600 series. Alternatively, the six beams could be reproduced by a single beam suitably controlled to simulate the plurality of beams arranged together but of course this will lead to a longer time to generate the representation. The adjacent cells which may be used to provide the additional colour density information depend on the position of the boundary in relation to the screen grid.

Preferably, a screen grid is defined by the plurality of half-tone dots, the screen grid defining first and second transverse axes and the or each adjacent cell is chosen from those immediately adjacent to the the cell in question along the first and second axes. In a more complex method the or each adjacent cell is chosen from those immediately adjacent to the the cell in question along the first and second axes and those immediately adjacent the cell in question and between the first and second axes. Typically, the axes are othogonal. However in general neither of the axes will be parallel with the direction of relative movement between the scanning beams and record medium.

In accordance with a second aspect of the present invention, apparatus for generating a half-tone dot representation of an original image which has been previously generated as one or more colour separations each comprising a plurality of cells, each cell being digitally encoded in accordance with the colour density of the original image at that position, comprises a record medium support; a plurality of scanning beam generators arranged side by side, the scanning beams and the record medium support being relatively movable; first control means for controlling the scanning beams during relative movement between the scanning beams and the record medium support in response to the digital information and half-tone dot information to generate a plurality of half-tone dots at a first rate, each dot corresponding to one or more of the plurality of cells; storage means for storing additional control information; and second control means for determining the position of the scanning beams relatively to a record medium on the support, determining whether that position corresponds to part of a boundary of an image portion, and, if it does, for at least one colour separation, for each cell at the boundary of an image portion modifying the plurality of scanning beams in response to the additional control information:

(i)a together at a second, higher rate, or
  (i)b in groups of one or more, or
  (i)c in groups of one or more and at a second, higher rate, and (ii) in response to colour density information partly corresponding to that cell and partly corresponding to one or more adjacent cells.

Conveniently, the additional control information stored by the storage means indicates to the second control means firstly which of the plurality of scanning beams should be controlled in response to colour density information corresponding to the cell in question and which in response to the colour density information corresponding to an adjacent cell and secondly defines which adjacent cell is to be used.

The first and second control means could be provided by a common microcomputer or other control logic.

The record medium may be a light sensitive sheet or for example a gravure cylinder which is engraved by the scanning beams.

An example of a method and apparatus in accordance with the present invention will now be described and contrasted with the prior art with reference to the accompanying drawings, in which.

Figure 1:
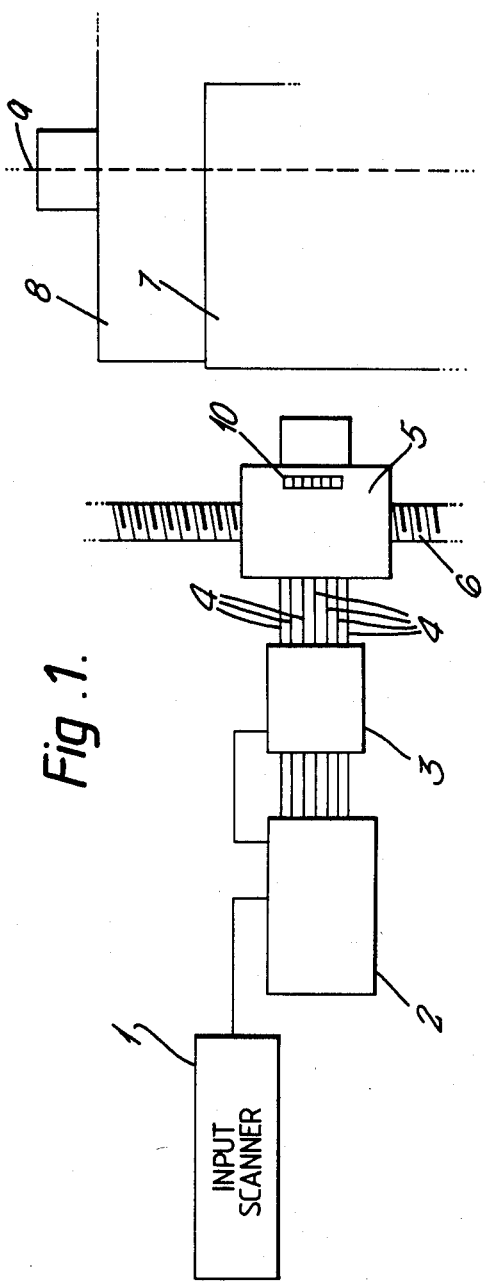
FIG. 1 is a schematic diagram of the apparatus.

The apparatus illustrated in FIG. 1 comprises an input scanner 1 which may be of conventional form such as our Magnascan 600 series and which generates digital colour density data which is fed to a colour data store 2. Typically, an image to be reproduced will be scanned to generate four sets of colour density data representing cyan, magenta, yellow and black. For the sake of simplicity, we shall only describe the reproduction of a single colour separation although in practice it is possible for more than one colour separation to be prepared at the same time. It should be understood that the invention is not concerned with how the digital data is generated and this could be by other means such as solely electronically.

The data stored in the store 2 is fed to processing circuitry 3 (to be described in more detail below) which provides six control signals on lines 4 to an exposing head 5. The exposing head 5 is mounted on a lead screw 6. A light sensitive sheet 7 is mounted on a cylinder 8 and in use relative scanning motion is achieved by rotating the cylinder 8 about its axis 9 and rotating the lead screw 5 to cause the exposing head 5 to move along the lead screw in a direction parallel to the cylinder axis. The rotation of the lead screw 6 is slow in relation to the rotation of the cylinder 8, so that a succession of axially spaced circumferential lines are scanned on the light sensitive sheet 7 wrapped around the cylinder 8. The exposing head 5 comprises a row of side-by-side light modulators or light sources 10 which are individually controlled by the signals on the lines 4 from the processing circuitry 3. Thus, in this example, the scanning line is broken up transversely into six side-by-side areas. Typically a single laser source will generate an optical beam of radiation which is split and fed to each of the light modulators.

In a conventional scanner, such as the Crosfield Magnascan 600 series, the processing circuitry 3 effectively divides the surface of the light sensitive sheet 7 into a screen grid of dot cells and during relative movement between the light sensitive sheet 7 and the scanning beams, the circuitry 3 determines for each quadrant of each dot cell the corresponding colour density data stored by the store 2. In accordance with that information, the circuitry 3 then controls the on/off conditions of the light modulators 10 so that for each dot cell a half-tone dot is generated on the light sensitive sheet 7 having a size which is related to the appropriate colour densities.

The scanner stores half-tone dot information relating to a single dot cell. A typical dot cell is broken down into a large number of sub units each sub unit containing information for controlling the light modulators 10. Thus, if the scanned image is determined to have an intensity which is 50 percent that of the maximum intensity possible, then the light modulators will be controlled in accordance with the half-tone dot information so that 50 percent of a dot cell will be exposed.

Figure 2:
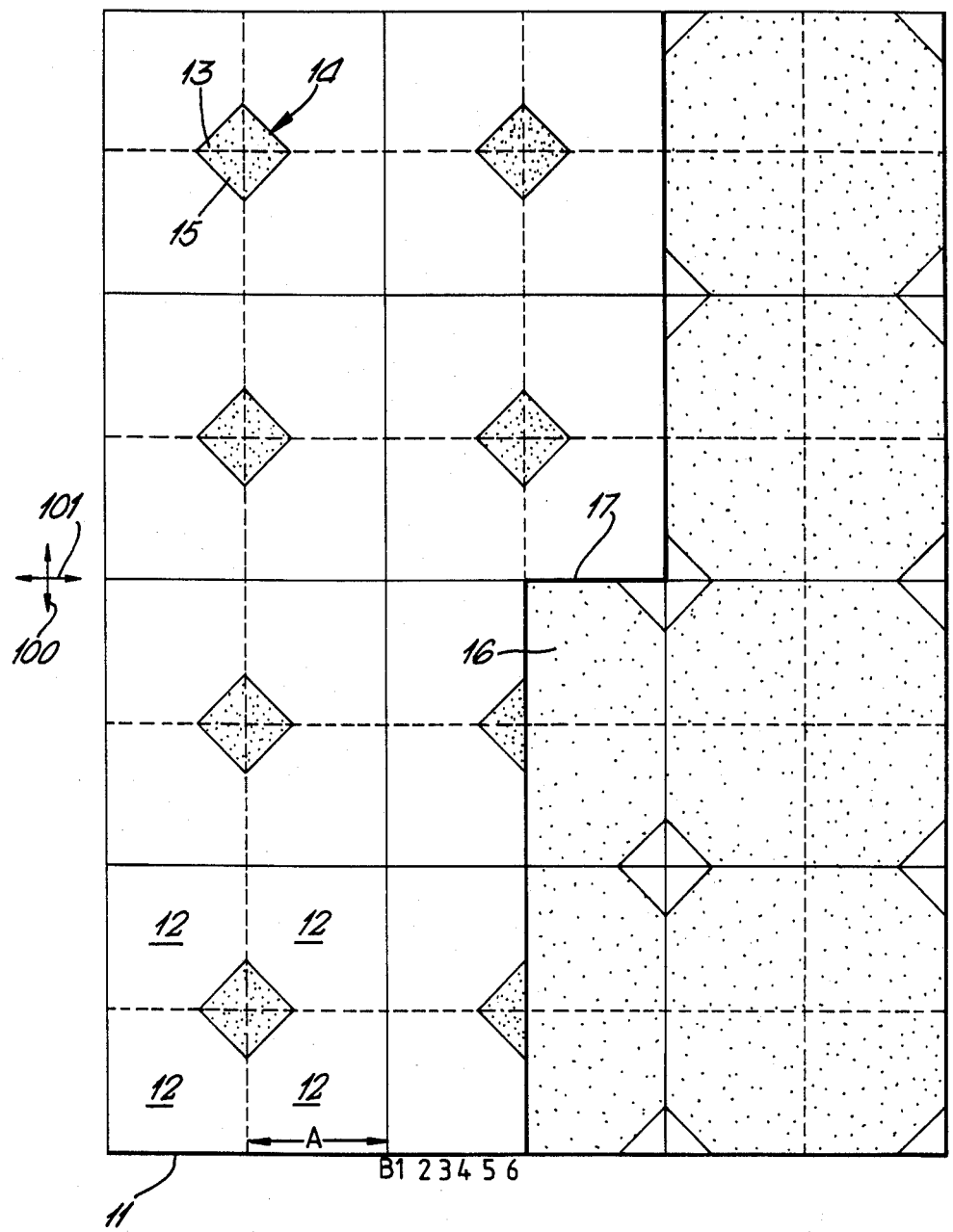
FIG. 2 illustrates in enlarged, schematic form the junction between two graphics images as generated by prior art apparatus.

FIG. 2 illustrates a small portion of the record medium, much enlarged, with the dot cells of the screen grid superimposed for clarity. The grid shown in FIG. 2 comprises 12 dot cells 11 arranged in a 3×4 array, each dot cell 11 being sub-divided into four graphics cells 12. Typically, each graphics 12 cell has a square shape with the distance A being about 1/300 inch. The screen grid defines orthogonal axes 100, 101 which in this example lie parallel with and perpendicular to the scanning direction.

The six scanning beams generated by the light modulators 10 have a total width corresponding to the length A and in one circumferential scan of the record medium 7 the six beams will expose a single column of graphics cells 12. Thus, to scan completely the area of the record medium shown in FIG. 2, six circumferential scans are required.

FIG. 2 illustrates the appearance of a small portion of the record medium 7 in which the left hand portion of the colour separation has a constant, low colour density of for example 30 percent while the right hand portion has a constant, high colour density of for example 90 percent. These portions may represent parts of two different graphics images which are abutted together. During relative scanning movement between the scanning beams (labelled B1-6) and the record medium, as the scanning beams reach a particular graphics cell 12 the processing circuitry accesses colour density information from the colour data store 2 which, in the case of the upper left hand graphics cell 12 in FIG. 2 will specify 30 percent. The six beams are then controlled together to form a portion 13 of dot 14. The portion 13 fills 30% of the graphics cell 12. As the scanning beams reach the next graphics cell 12, the colour data store 2 is again accessed and again specifies 30 percent colour density and a second part 15 of the dot 14 is formed. The exact shape of the dot 14 is determined by the half-tone dot information as previously described.

The next scan of the six beams will expose the graphics cells 12 in the next adjacent, axially spaced circumferential scan line and thus the remainder of each dot 14 will be formed. The next scan of the six beams will be similar to the first scan but the following scan will be different. In FIG. 2, the first two pairs of graphics cells 12 which are exposed will be similar to the first two pairs exposed in the second scan but when the colour data store 2 is accessed as the beams reach the graphics cell labelled 16 it will indicate 90 percent rather than 30 percent. At this point, the half-tone information indicates that the majority of the graphics cell 16 must be exposed and the six beams are controlled accordingly. In a similar way, the remaining three graphics cells shown are exposed. For the next two scans, the colour data store 2 indicates 90 percent for each cell 12 and this is shown in FIG. 2. The areas of FIG. 2 shaded with dots are those areas which will be coloured during printing.

FIG. 2 shows clearly that at the junction between the two images there is a significant step 17 which will be clearly visible. With the conventional method, there is no way in which the edge 17 can be modified except by having previously scanned the original image at a higher resolution.

Figure 3:
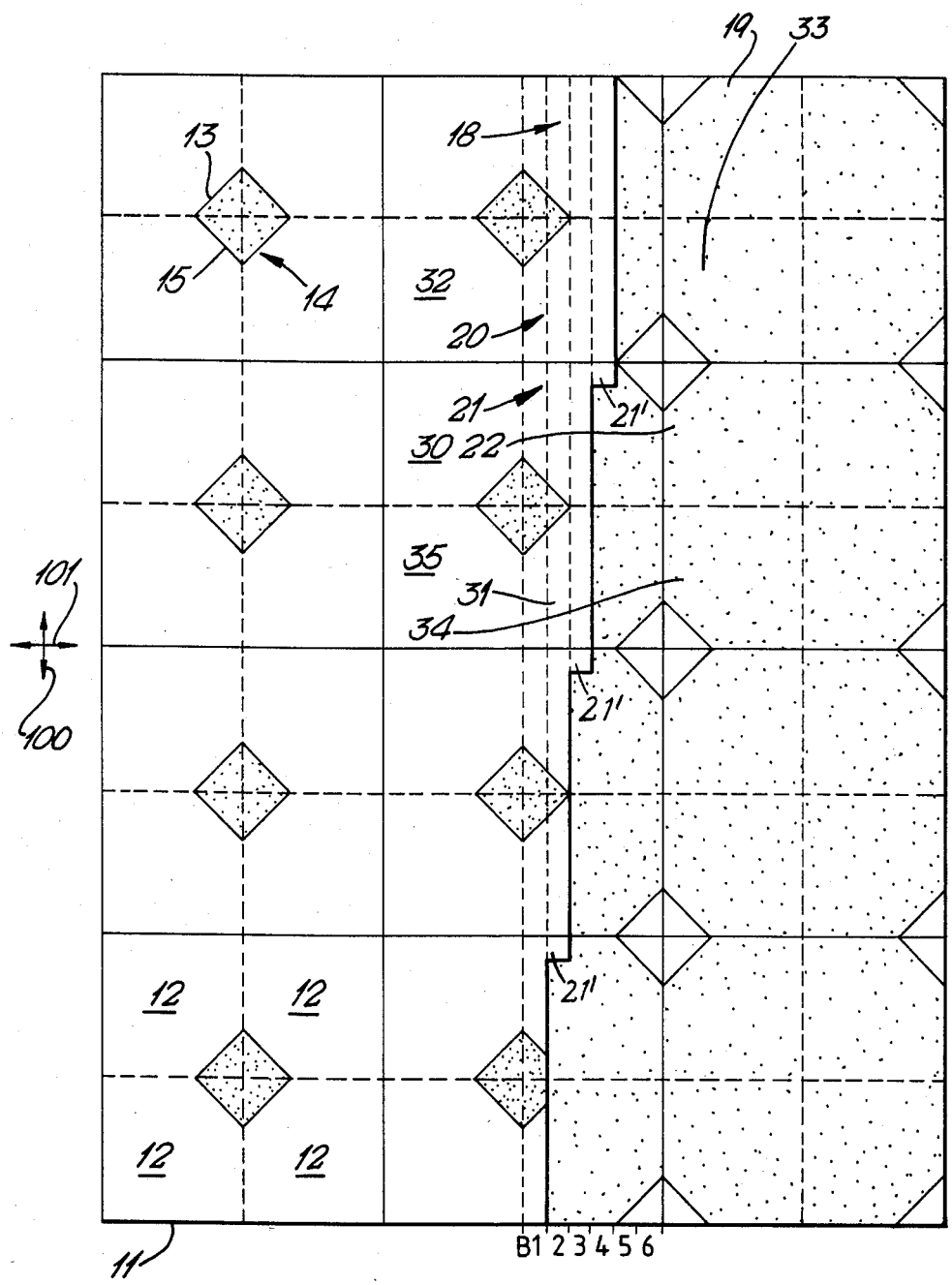
FIG. 3 is similar to FIG. 2 but illustrating the junction generated by apparatus in accordance with the invention; and, FIG. 4 is a block diagram of the processing circuitry of the apparatus shown in FIG. 1.

FIG. 3 illustrates one way in which a method in accordance with the invention can be used to reduce the effect of the step 17. FIG. 3 corresponds exactly with FIG. 2 and once again the first three scans of the six beams will generate portions of dots 14 in an exactly similar manner. However, when the six beams B1–B6 begin to scan the fourth line of graphics cells 12 they are controlled in a different manner by the processing circuitry 3. As the beams reach the first graphics cell 18, beams B1–B4 are controlled by the colour density data stored in the store 2 corresponding to the graphics cell 18 while beams B5–B6 are controlled in response to the colour density data stored relating to the graphics cell 19. This latter data indicates 90 percent density while the normal colour density for the graphics cell 18 is 30 percent. As can be seen in FIG. 2, this causes the 90 percent colour density to extend by an amount corresponding to the width of two of the scanning beams (B5,B6) into the graphics cell 18. The beams are similarly modified in the graphics cell 20.

With the invention the beams can be modulated up to six times within a graphics cell 12, thus enabling the graphics cell to be divided into 36 text cells (not shown).

When the scanning beams reach the graphics cell 21, beams B1–B4 are controlled in response to the normal graphics cell colour density, that is 30 percent, and beams B5–B6 are controlled as before. After one text cell 21′ has been scanned however beam B4 is added to beams B5, B6 for modification in accordance with colour density information relating to the graphics cell 22, that is 90 percent. In a similar way, a further beam is added after the scanning beams have scanned the first text cell of each new dot cell and it will be apparent from FIG. 3 that the junction between the two images is much smoother and the large step 17 has been removed. For the remaining two columns of graphics cells 12, the process is exactly as in the FIG. 2 example.

It should be appreciated that there are a number of ways in which the beams B1–B6 can be modified and the example shown in FIG. 3 is just one of these ways. For example, the beams could be modified differently at every graphics cell 12 or text cell.

The modification of beams successively as shown in FIG. 3 is appropriate where the boundary lies generally in the direction of scanning but where for example the boundary lies transverse to the scanning direction then instead of modifying successive beams, groups of two, three or all six beams for example could be modified with colour density information from the previous graphics cell for a portion of the graphics cell in question corresponding to one or more text cells and then modified in accordance with colour density information for that graphics cell but at a higher rate to achieve resolution with text cell dimensions for the remaining text cells in the corresponding scan line(s). Other variations are also possible.

Figure 4:
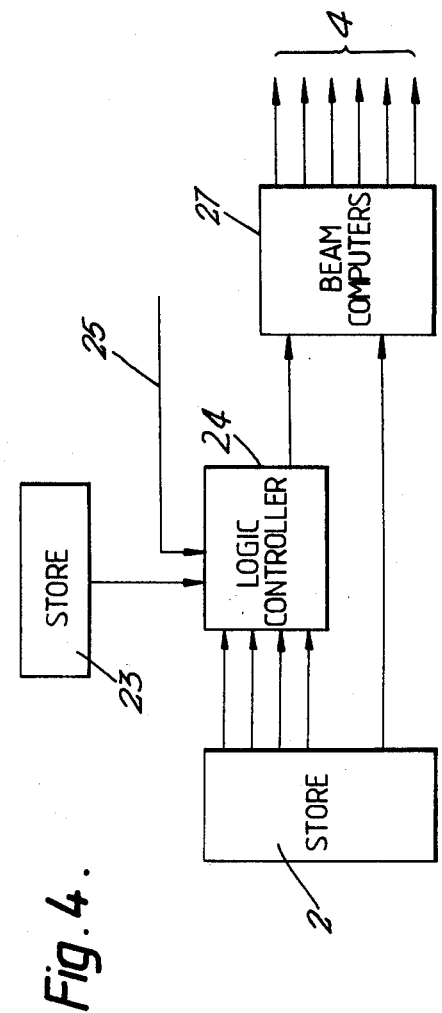

FIG. 4 illustrates diagrammatically the processing circuitry 3 in more detail. The processing circuitry includes a memory 23 such as a Winchester disc in which is stored information determining where a boundary of an image occurs. This information will have previously been determined by for example an operator using our Studio 800. In the example shown in FIG. 3, the information stored will be details of the graphics cells 12 in which a boundary between the two images is to be defined together with the colour density information for the adjacent cells. In addition, the memory 23 includes control information for determining which of the beams B1–B6 should be modified in accordance with colour density information from adjacent cells and which should be controlled in response to the normal graphics information from that cell and further defines which adjacent cell or cells should be used. A logic controller 24 (such as the Crosfield Electronics Board 7507-9210) receives information on a line 25 from which it determines the location of the scanning beams relatively to the record medium and hence the graphics cell which the scanning beams are about to enter. The logic controller 24 compares the current location with the locations stored in the memory 23 and if no match is found indicating that the graphics cell does not include a boundary then beam computers 27 are controlled in a conventional manner to receive the normal colour density data from the store 2. The beam computers 27 then actuate the light modulators 10 via the lines 4.

If the controller 24 determines that the graphics cell to be entered is one which will include a boundary, it accesses the color density data from the store 2 relating to the appropriate adjacent cell and outputs this together with control information for controlling which of the beam computers should be modified.

Conveniently, the data stored in the memory 23 is in the form of three eight bit bytes. The first two bytes define the coordinates of the relevant graphics cells while the third byte has the following form:

a b c d e f g h where the bits labelled a–f correspond to the six scanning beams and the bits g, h define the adjacent cell to be accessed. Thus for example if the cells adjacent to any particular cell are labelled L, U, R, D (meaning left, up, right, down) then these could be coded as follows:

L: 00
U: 01
R: 10
D: 11

The bits a–f are coded binary "0" to indicate that the normal colour density data for that cell should be accessed to control that beam while they are coded binary "1" to indicate that the specified adjacent cell should be accessed. Thus, in FIG. 3, the second byte relating to the graphics cell 21 will be coded:

00011110 indicating that beams B1–B3 should be controlled in accordance with the normal graphics cell information while beams B4–B6 should be controlled in response to the adjacent cell colour density information, that is the graphics cell 22.

Taking the cell 21 as an example, the graphics cells corresponding to L,U,R,D are 30,20,22 and 31 respectively. In addition, the adjacent cell could be chosen from the cells 23,33,34 and 35.

The method just described is the most simple form of the invention. More complex coding techniques can be used to enable the beams to be modified in more than two groups in accordance with colour density information from more than one adjacent cell.

We claim:

1. A method of generating a half-tone dot representation of an original image which has been previously scanned into one or more colour separations each comprising a plurality of cells, each cell being digitally encoded in accordance with the color density of the original image at that position, the method comprising for one or more of said colour separations exposing a record medium to a plurality of scanning beams arranged side by side, said scanning beams being controlled together at a first rate, during relative movement between the scanning beams and the record medium, in response to the digital information and half-tone dot information to generate a plurality of half-tone dots, each dot corresponding to one or more of the plurality of cells; and for each cell at the boundary of an image portion modifying said plurality of scanning beams:
   (i)a together at a second, higher rate, or
   (i)b in groups of one or more, or
   (i)c in groups of one or more and at a second, higher rate, and
   (ii) in response to colour density information partly corresponding to that cell and partly corresponding to one or more adjacent cells.

2. A method according to claim 1, wherein a screen grid is defined by said plurality of half-tone dots, said screen grid defining first and second transverse axes and wherein the or each adjacent cell is chosen from those immediately adjacent to the cell in question along said first and second axes.

3. A method according to claim 1, wherein a screen grid is defined by said plurality of half-tone dots, said screen grid defining first and second transverse axes and wherein the or each adajcent cell is chosen from those immediately adjacent to the cell in question along said first and second axes and those immediately adjacent the cell in question and between said first and second axes.

4. A method according to claim 2, wherein said axes are orthogonal.

5. A method according to claim 1, wherein said axes are orthogonal.

6. Apparatus for generating a half-tone dot representation of an original image which has been previously generated as one or more colour separations each comprising a plurality of cells, each cell being digitally encoded in accordance with the colour density of the original image at that position, said apparatus comprising a record medium support; a plurality of scanning beam generators arranged side by side for generating respective scanning beams, said scanning beams and said record medium support being relatively movable; first control means for controlling said scanning beams during relative movement between said scanning beams and said record medium support in response to said digital information and half-tone dot information to generate a plurality of half-tone dots at a first rate, each dot corresponding to one or more of said plurality of cells; storage means for storing additional control information; and second control means for determining the position of the scanning beams relatively to a record medium on said support, determining whether that position corresponds to part of a boundary of an image portion, and, if it does, for at least one colour separation, for each cell at said boundary of an image portion modifying said plurality of scanning beams in response to said additional control information:
   (i)a together at a second, higher rate, or
   (i)b in groups of one or more, or
   (i)c in groups of one or more and at a second, higher rate, and
   (ii) in response to colour density information partly corresponding to that cell and partly corresponding to one or more adjacent cells.

7. Apparatus according to claim 6, including a record medium, the record medium comprising a gravure cylinder.

8. Apparatus according to claim 6, wherein the scanning beam generators generate substantially coherent beams of optical radiation.

* * * * *